Jan. 14, 1958     E. W. CARROLL     2,819,787
PEACH ORIENTATOR
Filed Sept. 25, 1947
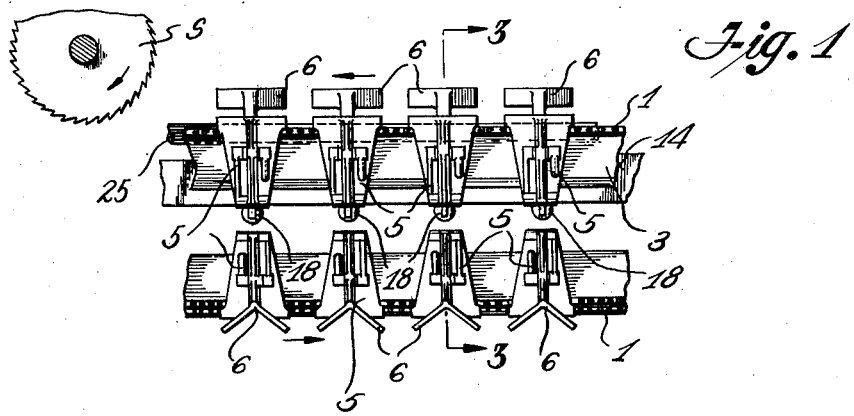
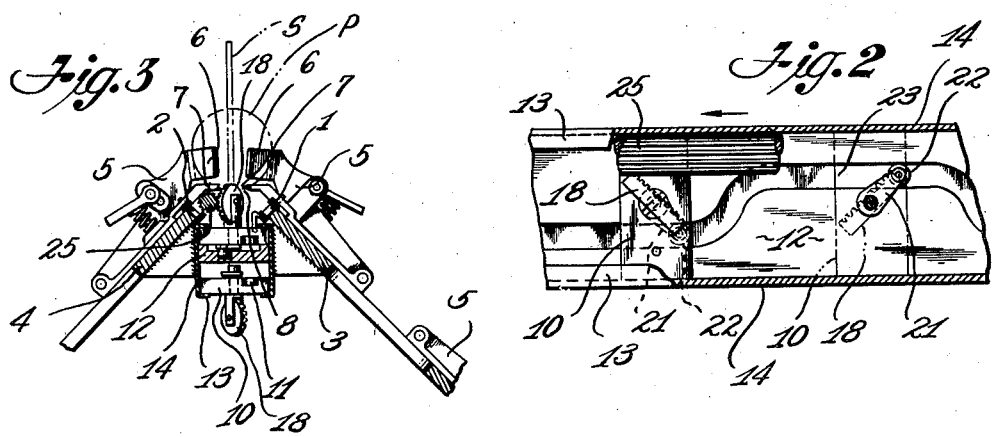
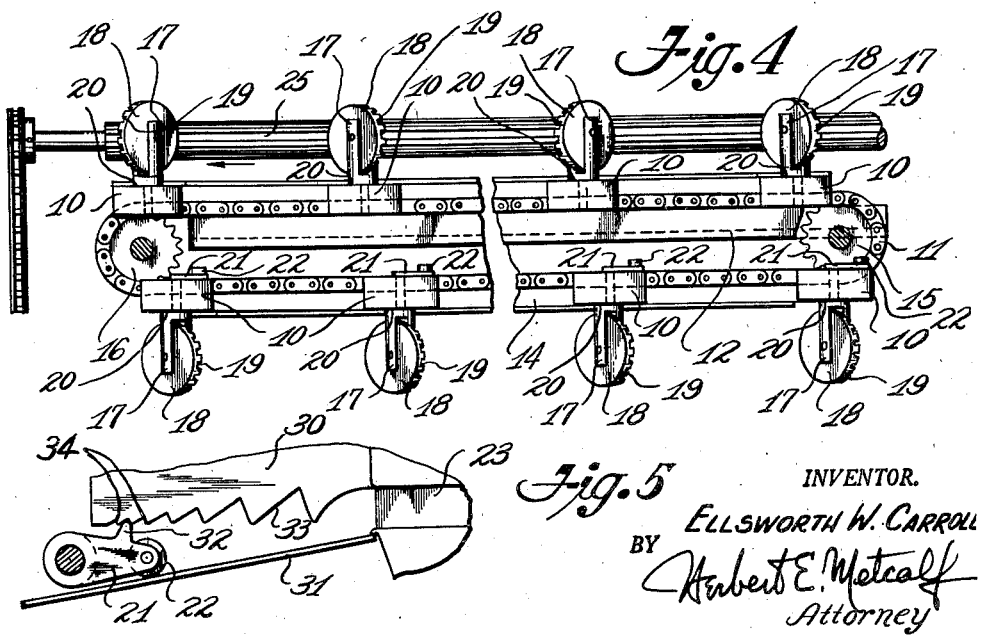
INVENTOR.
ELLSWORTH W. CARROLL
BY Herbert E. Metcalf
Attorney

United States Patent Office 2,819,787
Patented Jan. 14, 1958

2,819,787

PEACH ORIENTATOR

Ellsworth W. Carroll, Redwood City, Calif., assignor to S & W Fine Foods, Inc., San Francisco, Calif., a corporation of California Application September 25, 1947, Serial No. 776,058

15 Claims. (Cl. 198—33)

My present invention relates to a means and method of orientating indented fruit and is particularly adapted for the orientation of large fruit, such as peaches, for example.

In a previous patent of mine (United States Patent No. 2,220,511, issued September 12, 1940), I described a machine for orientating indented fruit, such as cherries, by rotating the fruit around a horizontal axis with a fruit supporting wheel to register the stem indent with the wheel. The wheel was so proportioned with respect to the average size of the stem indent that when registry occurred no further rotation would be made due to loss of drive contact. The cherries were then pitted in the attitude as predetermined by wheel position so that a high percentage of the output is uniformly pitted with the pit hole where the stem indent previously existed.

In one of the modes of operation of such an orientation device I found it preferable to rotate the fruit in different horizontal planes, in order that the probability of the stem indent registering with the drive wheel be increased. This was done, in the machine of the cited patent, by transferring the fruit serially into a plurality of receptacles having fruit supporting wheels rotating in several planes. This mode of operation has proved to be very effective in obtaining a high percentage of properly orientated fruit, but has required the use of an intermittently moved conveyor. The present invention has for an object the provision of substantially the same advantageous type of orientation, with fruit rotation in several horizontal planes without requiring transfer of the fruit, or removal from a receptacle. Thus, the conveyor of the orientating machine of the present invention may then be progressed continuously, making for a more simple construction and a higher output.

Furthermore, indented fruit such as peaches have a distinct seam or suture on one side thereof, and if the fruit be halved as, for example, for canning, in most instances one half of the fruit will show the seam, the other half being smooth. It is very desirable for a uniform output that a peach halving machine be capable of halving the fruit in a plane cutting through the seam, thus leaving both halves smooth. I have found that by taking advantage of the fact that seamed fruits have a stem indent that is elongated in the plane of the seam, I can utilize the asymmetrical shape of the indent to advantage in orientating the seam. By making the orientation wheel fit the elongation of the indent, and then oscillating the wheel after it registers with the indent in any rotational position with respect to the wheel, the fruit can be turned while still in registery with the indent until the indent fits the wheel. Thus, another object of the invention is to orientate the fruit with respect to the seam or suture.

I have also found that registry, but not necessarily fit, of the fruit indent with the wheel shaped to fit the elongation of the indent, is sufficient to orientate the fruit with respect to the indent generally, so that thereafter with the same wheel and with the fruit in the same receptacle I am able to orientate with respect to the seam. Thus, still another object of the invention is to orientate first as to indent position and then as to seam position without changing the orientation means.

Other objects and advantages of my present invention will be apparent from a description of a preferred form thereof shown in the appended drawings, in which:

Figure 1 is a fragmentary view of a peach conveyor and the receptacle mounted thereon.

Figure 2 is top view partly in section and partly in elevation, showing how orientation wheels are driven.

Figure 3 is a view partly in elevation and partly in vertical section showing the relation between a receptacle and an orientation wheel during orientation.

Figure 4 is a side view in elevation showing how the orientation wheels are progressed over part of the conveyor path.

Figure 5 is a top plan view of a modification adapted to orientate seamed fruit with the seam in a predetermined position.

Referring first to Figures 1 and 3, a pair of endless conveyor chains 1 and 2 are mounted on inclined slides 3 and 4, respectively. Each chain carries a plurality of receptacle halves 5, each comprising a fruit holder 6 and a base plate 7, the base plates being separated to provide a wheel space 8 therebetween. The fruit holders are opposed and spaced to loosely support a peach on the base plates 7 as indicated by line P in Figure 3.

Chains 1 and 2 are progressed continuously over a predetermined path by any convenient means, the receptacle halves returning by sliding on the lower portions of inclined slides 3 and 4. At one end of the conveyor path, with the receptacles on top of the slides, peaches are loaded in any convenient manner into the receptacles formed by fruit holders 6, and at the other end of the conveyor path a pitting operation may take place. As an example, the fruit and pit may be halved by passing the peach at one end of the conveyor path past a vertically mounted circular saw S extending between the opposed receptacle halves while the fruit is held therein, as is known in the art.

Between the two ends of the conveyor path is positioned a fruit orientation device which is shown in more detail in Figures 2, 3, and 4. Here a plurality of wheel blocks 10 are joined by an endless sub-chain 11 and mounted to slide over the top of cam plate 12 and to return beneath it, the blocks being supported on the return trip by inturned edges 13 of casing 14, as shown in Figure 2. Sub-chain 11 is mounted on end sprockets 15 and 16, one of which is driven as by gearing to the conveyor chains to progress the blocks 10 at the same speed as conveyor chains 1 and 2.

Rotatably mounted on each block 10 is a rotatable split post 17 carrying an orientation wheel 18, one peripheral edge of which is provided with gear teeth 19. Each split post 17 extends through the block on which it is mounted, but is of lesser diameter within the block to provide a supporting shoulder 20 thereon. On the other side of the block, each post is provided with a side arm 21 terminating in a roller cam follower 22, best shown in Figures 2 and 3.

Cam followers 22 fit in a cam track 23 cut into the top of cam plate 12 so that as the blocks progress the split posts and wheels thereon are shifted with a 90° movement, as shown in Figure 4, to positions at a 45° angle to the conveyor progression line. Wheels 18 are rotated when in the angular positions with respect to conveyor travel, by engagement of wheel teeth 19 with an elongated, continuously rotating pinion 25.

As the wheels and receptacles progress, the wheels are timed to turn up and extend between the opposed base plates 7 of each receptacle and to extend upwardly sufficiently to contact and partially support a peach in the receptacle, provided the stem indent does not fit over the wheel. If it should, then the peach would not be rotated. When, however, the remainder of the peach surface is contacted, the peach will be rotated by the wheel in one horizontal plane, and then another 90° away until the stem indent registers with the wheel, when rotation will cease. Due to the 90° shifts in the planes of wheel rotation, and consequently of fruit rotation, the probability of registering the wheel and indent is increased and time of orientation is decreased.

After a number of rotational plane shifts, according to the length of the sub-conveyor, each wheel reaches the end of its path, turns downwardly, and returns, thus freeing the space between the receptacle halves for insertion of the saw, and leaving a large percentage of the fruit orientated with the stem indent down.

In certain types of peaches, it is also desirable that the peaches be orientated with the seam or suture plane of the fruit in line with the plane of the circular saw. This can be accomplished by utilizing a modification of the cam track, as shown in Figure 5.

I have found that fruit such as peaches having a seam or suture have the stem indent elongated in the plane of the suture, and I utilize that fact to further orientate the fruit.

By properly proportioning wheel size, the wheels will register more easily with the elongated indent aligned with the wheel than with the indent in any other position. By oscillating or vibrating the wheel after stem indent registry to a continuously decreasing angle, stopping with the wheel plane in the same plane as the saw, I have found that the peach can be turned with the seam plane aligned with the line of conveyor progression. In Figure 5, this is accomplished by positioning a pawl cam 30 on one side of the end of cam track 23, the pawl cam being opposed by a leaf spring 31 bearing against roller 22 to force a pawl 32 on arm 21 against pawl cam 30. The pawl cam 30 is provided with a saw tooth camming surface 33 to give maximum swing to the wheel at first, ending in a rapid vibration with smaller teeth 34 just before the wheel straightens out. It is also preferable to lift the wheel slightly during the action of the pawl cam, and this is done by slightly raising the level of the upper surface of cam block 12 along the extent of the pawl cam. In this manner, I have been able to orientate a high percentage of fruit, not only with the stem indent down but also with the seam or suture plane substantially in the plane of the saw, so that when the fruit is halved neither half is disfigured by having the suture prominently shown on the side thereof. A high quality output is thus assured.

From the above it will be seen that I have been able to continuously orientate indented fruit to a predetermined position with the stem indent down and to obtain a high percentage of properly orientated fruit by changing the plane of fruit rotation. Further, I have been able to additionally orientate a large percentage of the fruit with the seam or suture in a predetermined position after the stem indent is down.

I claim:

1. In a device for orientating indented fruit, a receptacle having separate receptacle halves opposed to hold a fruit with a lower space between said halves, a fruit revolving member extending into said space to partially support said fruit and mounted to revolve in a vertical plane, means for rotating said member, and means for changing the vertical plane of rotation of said member with reference to said receptacle halves.

2. Apparatus in accordance with claim 1 wherein means are provided to continuously progress said receptacle halves and said fruit revolving member over a conveyor path.

3. In a device for orientating indented fruit, a receptacle having separate receptacle halves opposed to hold a fruit with a lower space between said halves, a fruit revolving member extending into said space to partially support said fruit and to revolve said fruit in a vertical plane, means for driving said member, means for changing the position of said fruit revolving member to change the plane of rotation of said fruit, and means for progressing said receptacle halves and said fruit revolving member over a conveyor path, said fruit revolving members being driven in planes 45° to the line of the conveyor path and moved to positions providing fruit rotation planes 90° apart.

4. Apparatus in accordance with claim 3 wherein said fruit revolving member is a wheel sized to enter the stem indent of said fruit.

5. Apparatus in accordance with claim 3 wherein said fruit revolving member is a wheel sized to enter the stem indent of said fruit and wherein one side of the periphery of said wheel is provided with gear teeth, said driving means being an elongated rotating pinion meshing with said teeth after each 90° position shift.

6. In an orientation device for indented fruit, a fruit receptacle having a lower opening therein, a wheel positioned in a vertical plane in said opening to partially support a fruit in said receptacle, means for rotating said wheel and means for changing the plane of rotation of said wheel with reference to said fruit receptacle.

7. In an orientation device for indented fruit, a fruit receptacle having a lower opening therein, a wheel positioned in a vertical plane in said opening to partially support a fruit in said receptacle, means for rotating said wheel and means for changing the plane of rotation of said wheel by 90° with reference to said receptacle.

8. In a machine for orientating indented and sutured fruit, a wheel having the periphery thereof shaped to enter and register with the indent of said fruit when coincidence of said periphery and indent occurs, mounted to rotate in a vertical plane, means for maintaining a fruit in contact with said wheel in a position wherein said wheel supports at least a portion of the weight of said fruit, and means for moving said wheel to a different vertical plane with reference to said maintaining means.

9. In a machine for orientating indented and sutured fruit, a wheel having the periphery thereof shaped to enter and register with the indent of said fruit when coincidence of said periphery and indent occurs mounted to rotate in a vertical plane, means for maintaining a fruit in contact with said wheel in a position wherein said wheel supports at least a portion of the weight of said fruit, and means for moving said wheel from one vertical plane to another with reference to said maintaining means while said fruit is supported on said wheel.

10. In a device for orientating fruit having an elongated indent, a wheel having the periphery thereof shaped to enter and register with the indent of said fruit when coincidence of said periphery and indent occurs, and having its axis in the horizontal plane, means for at least partially supporting a fruit on said wheel with said wheel entering said indent, and means for changing the position of the wheel axis in the horizontal plane with reference to said supporting means while said wheel is in said indent.

11. In a device for orientating fruit having an elongated indent, a wheel having the periphery thereof shaped to enter and register with the indent of said fruit when coincidence of said periphery and indent occurs, and having its axis in the horizontal plane, means for at least partially supporting a fruit on said wheel with said wheel entering said indent, means for changing the position of the wheel axis in the horizontal plane with reference to said supporting means while said wheel is in said indent, and means for returning said axis to a predetermined position after an axis position change.

12. Apparatus in accordance with claim 3 wherein means are provided to place said wheel in a predetermined rotational plane after plane of rotation change has been made.

13. In a machine for orientating indented fruit, a carrier, means defining a plurality of fruit recesses mounted on said carrier, each of said recesses having an aperture in the bottom thereof, a wheel positioned to project into each recess through said aperture and mounted to rotate in a vertical plane and for rotation on a vertical axis, means for progressing said carrier, means for synchronously progressing said wheels with said recess defining means, means for rotating said wheels in a vertical plane, and means for rotating said wheels on said vertical axis to change the vertical plane of rotation thereof.

14. In a device for orientating indented fruit, a receptacle having separate receptacle halves opposed to hold a fruit with a lower space between said halves, a fruit revolving member extending into said space to partially support said fruit, and mounted to revolve in a vertical plane, means for rotating said member, means for changing the vertical plane of rotation of said member with reference to said receptacle halves, means to continuously progress said receptacle halves and said fruit revolving member over a conveyor path, and means to remove said fruit revolving member from said space prior to the end of said conveyor path.

15. In a device for orientating whole fruit the combination of a rotatable orientating member shaped to engage the curved surface of a whole fruit body and to enter the stem indent thereof when in registration with said stem indent, means for pivotally shifting the orientating member about an axis disposed angularly to the axis of rotation of said orientating member to turn the orientating member relative to the fruit body to orientate the suture plane of the fruit body, and means for thereafter turning the orientating member about said last mentioned axis while engaged in the suture plane to position the suture plane in a predetermined direction.

References Cited in the file of this patent
UNITED STATES PATENTS

| | | |
|---|---|---|
| 1,742,653 | Goranson | Jan. 7, 1930 |
| 2,051,695 | Glacy | Aug. 18, 1936 |
| 2,220,511 | Carroll | Nov. 11, 1940 |
| 2,308,039 | Ashlock | Jan. 12, 1943 |
| 2,334,416 | Kok | Nov. 16, 1943 |